Patented Nov. 1, 1932

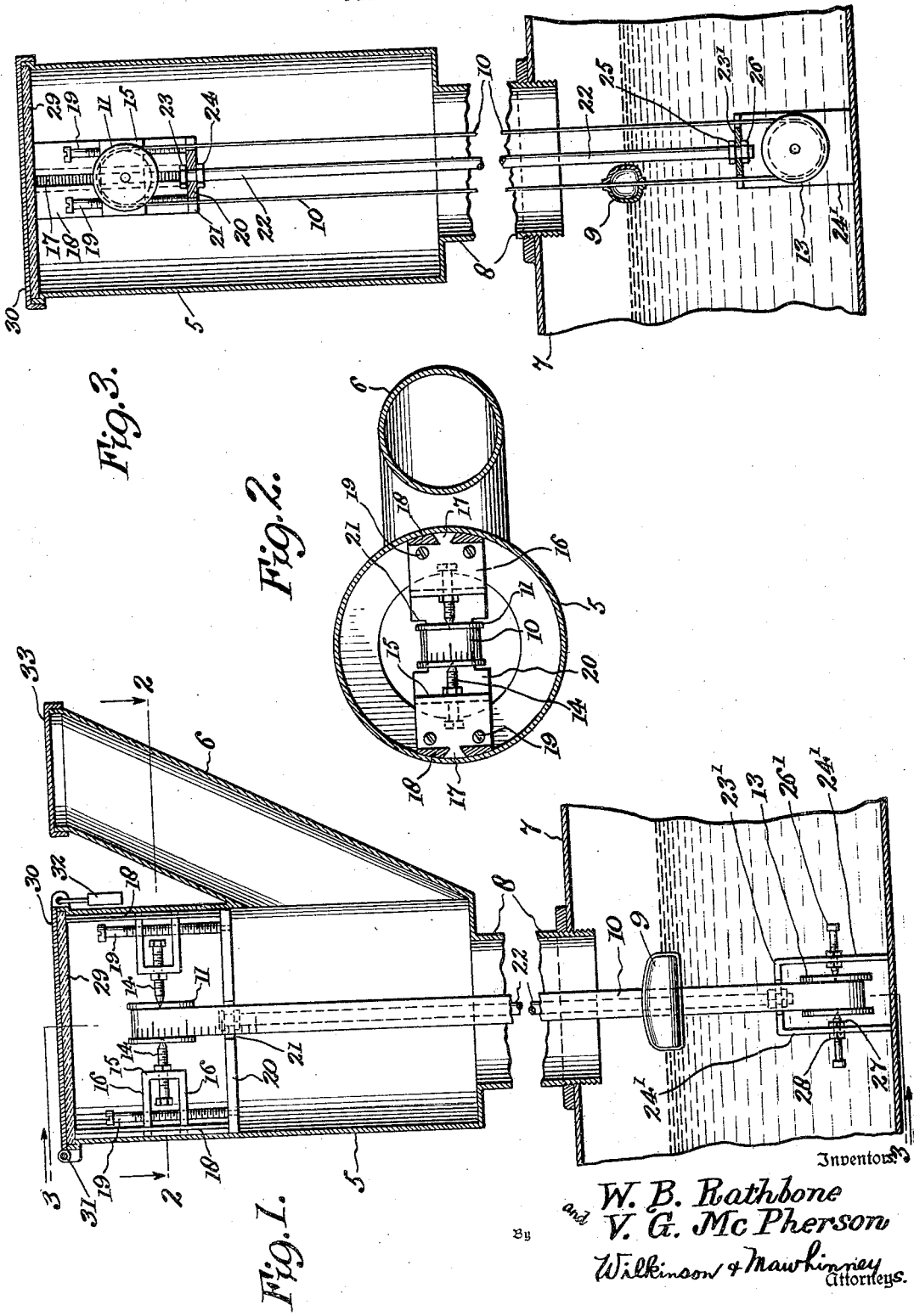

1,886,304

UNITED STATES PATENT OFFICE

WOFFORD R. RATHBONE, OF HAMMOND, AND VERSTILLE G. McPHERSON, OF NEW ORLEANS, LOUISIANA

GAUGE

Application filed March 4, 1931. Serial No. 520,039.

The present invention relates to improvements in gauges, and has for an object to provide an improved gauge for use in connection with tanks, either above or below ground, particularly with tanks for containing gasoline or other petroleum products which are usually installed below ground.

It is another object of the invention to provide an improved gauge which may be quickly and accurately read so that a constant gauge of the contents of the tank is made possible.

A further object of the invention is to provide an improved gauge which will be of a simple form of construction, admitting of a wide variety of adjustment and mounted in connection with the intake line of the tank.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a vertical section taken through a portion of the tank and intake line and illustrating an improved gauge constructed according to the present invention.

Figure 2 is a horizontal section taken on the line 2—2 in Figure 1, and

Figure 3 is a vertical section taken on the line 3—3 in Figure 1.

Referring more particularly to the drawing, 5 represents a housing which may form a portion or extension of the intake line or filling neck 6 for the sunken gasoline or other tank 7. The lower portion of the intake line is indicated at 8 and has a conventional fit with the tank 7. Gasoline or other fuel is contained in the tank 7 and is withdrawn thereby from time to time as in the supplying of automobiles with gasoline, and it thereby becomes important to ascertain, at any particular time, the liquid level of the contents of the tank 7, which, being underground or otherwise inaccessible, is not open for ready inspection.

Pursuant to the invention, there is a float 9 of any desired type affixed to an endless or continuous tape 10 of thin sheet metal or other appropriate material, which tape runs over an upper pulley or flanged wheel 11 and a lower pulley or flanged wheel 13.

The upper pulley 11 is mounted between adjustable spindles 14. For the purpose of adjustment, the spindles 14, which are preferably pointed where they engage the ball bearing pulley 11, are supplied with threads on their shank portions, which threads engage through threaded openings in brackets which include the vertical portions 15 and the horizontal legs 16. These legs 16, as shown more particularly in Figure 2, are formed with dove-tail extensions 17 occupying correspondingly formed grooves in fixed bearing pieces 18, which are installed within the upper portion of the housing 5 and at diametrically opposite points.

The slides 15, 16 are adjustable vertically by the use of screws 19 or other appropriate devices, two screws being preferably employed to each slide to avoid binding and the screws are preferably locked close to the bearing pieces 18 at their axes parallel to the length of such strips 18. The lower ends of the adjusting screws 19 have a bearing in a fixed plate 20 that extends across within the housing 5 below the guide strips 18. As shown more particularly in Figures 2 and 3, the plate 20 is formed with cut-out portions 21 along both front and rear edges and at its central point for the purpose of receiving therethrough the sliding sides or runs of the tape 10. The side walls of the cut-out portions 21 aid with the flanges of the pulleys 11 and 13 in maintaining proper trackage of the tape 10.

The plate 20 has affixed thereto the upper portion of a rigid rod 22, the connection being adjustably effected by lock nuts 23 and 24 screwed upon the rod 22 and engaging upper and lower surfaces of the plate 20, respectively. The rod 22 extends down between the two runs of the tape 10 and at its lower end is affixed to a lower bearing member composed of the upper yoke piece 23' and the legs 24', which latter are adapted to rest upon the bottom of the tank 7 or not, as desired. Lock nuts 25 and 26 are threaded upon the lower portion of the rod 22 and engage upon opposite sides of the yoke piece 23'. The legs 24' are provided with threaded openings to receive the threaded shanks of the adjusting spindles 26' of the lower ball bearing pulley 13, and lock nuts 27 and 28 are threaded upon these threaded adjusting screws 26' and take against opposite faces of the legs 24'.

The upper portion of the housing is enclosed by a glass plate or panel 29 and by an opaque metallic or other removable cover 30 which, as shown, may be hinged at one side as indicated at 31, and be provided with a lock 32 at its other side.

The filling neck 6 is shown as provided with the usual form of cover 33.

In the use of the device, the cover 33 of the filling neck 6, which projects above the ground, may be removed when desired, and gasoline or other liquid from a tank wagon or other source of supply may be fed into the tank 7 through the fuel line. The opaque protective cover 30 of the housing will be unlocked by an authorized person from time to time for the purpose of taking a reading on the calibrated tape 10 through the inspection glass 29. The float 9 will rise and fall with the liquid level in the tank 7 and will carry with it the calibrated tape, causing the tape to move over the pulleys 11 and 13. The scale or markings on the tape 10 will correspond to the capacity of the tank and will slow the amount of liquid in the tank at any particular time. The tape will thus give an instant and accurate reading of the contents of the tank 7.

The advantages of this method of gauging are many, but chiefly the element of time and accuracy are stressed. Under the present method of gauging by the rod, several gauges are necessary at a gauging for a tank.

Each will show a different reading and an average must be taken, seldom resulting in accuracy, with time consumed of ten to twenty minutes per tank. The improved gauge will insure accuracy and will reduce time of gauging to that required to unlock and lift the cover 30, which can be accomplished from one to three minutes.

It is essential to get proper tracking of the tape 10, so as to have ease of movement of the tape and float, and thereby the adjustments afforded by this device become important. The tape may be slackened or drawn taut by the movement of the adjusting screws 19 in the one or other direction, causing the slides 15, 16 to either ascend or descend upon their guide ways. The pulleys 11 and 13 may be moved to correct vertical alignment by adjusting the spindles 14 and 26'.

The rod 22 connects the upper and lower portions of the device and enables the entire device to be inserted and lifted out through the fuel line 8.

This device may be applied to existing forms of tanks by substituting the upper casting 5, 6 for that upon the present fuel line.

It will be noted that readings may be taken through the pyrex glass or other transparent cover 29 covering the upper part of the pulley 11.

When the device is to be used only through a gauge line opening of a tank, the container box will not be cast with the fill opening in connection, but only to contain the working parts of this gauge.

It will be obvious that various changes in the construction, combination and arrangement of parts could be made, which could be used without departing from the spirit of our invention, and we do not mean to limit the invention to such details, except as particularly pointed out in the claims.

Having thus described our invention, what we claim and desire to secure by Letters Patent of the United States is:—

1. In a gauge, a housing, a filling neck extending off said housing, a glass cover for the housing, an opaque cover above the housing, means to lock the last mentioned cover, a cut away plate within the housing, an endless calibrated tape tracking through the cut away portions of the plate, a pulley above the plate for receiving the tape, an adjustable support for said pulley, a rod extending down from said plate, a bracket carried by said rod, adjustable bearings carried by said bracket, a lower flanged pulley carried by the adjustable bearings for receiving the lower portion of the tape, and a float affixed to the tape.

2. In a tank gauge, a fuel line to the tank, a housing at the upper portion of the fuel line, a filling neck extending substantially diagonally up from the lower portion of said housing, a transparent cover for the housing, a removable opaque cover above the transparent cover, means to lock the opaque cover, supporting means in the housing above the connection of the filling neck, a pulley supported from said supporting means, a bracket in the lower portion of the tank, a rigid connection between said supporting means and bracket, a pulley in the bracket, a calibrated tape trained over said pulleys, and a float on the tape.

VERSTILLE G. McPHERSON.
WOFFORD R. RATHBONE.